UNITED STATES PATENT OFFICE.

KARL LUDWIG VALENTIN ZIMMER, OF HAMBURG, GERMANY.

PROCESS FOR INCREASING THE HEAT-RESISTING PROPERTIES OF BITUMINOUS OR TARRY MATERIALS.

1,084,520.
Specification of Letters Patent.
Patented Jan. 13, 1914.

No Drawing. Application filed June 18, 1910. Serial No. 567,694.

*To all whom it may concern:*

Be it known that I, KARL LUDWIG VALENTIN ZIMMER, manufacturer, a subject of the German Emperor, residing at Hamburg, Germany, have invented a certain new and useful Process for Increasing the Heat-Resisting Properties of Bituminous or Tarry Materials, of which the following is a specification.

The present invention has for its object, to treat bituminous or tarry substances, such as mineral resins, tar, pitch, goudron and similar materials so that they become more difficult to fuse, more fire-resisting and almost incombustible.

If bituminous or tarry materials are liquefied by heat and applied as a paint or coating to vertical or slanting walls, these materials have the undesirable property of running off in the shape of waves, whereby the uniformity of the layer is destroyed. The present process prevents this defect and at the same time renders these products more fire-resisting, so that they can be used in numerous cases, where hitherto their use had been rendered impossible by the danger of fire. For this purpose I incorporate with the said products, such as all kinds of mineral resins, tar and pitch, a material capable of absorbing and combining with chlorin, and then treat the product by means of hexa-chlorethane. Among chlorin-carriers are the unsaturated fatty acid esters, such as linseed oil, rape oil and similar materials. Specially suitable for this purpose is the milky juice of the plant "guayule."

The following example will show the details of procedure: About 20 parts of the above mentioned fatty acid esters are melted together with 80 parts of mineral resins, and hexa-chlor-ethane is introduced into the molten mass.

It is advantageous to relieve the tarry product of water, before further use, by heating it in a retort, until it ceases to give off steam.

The products thus obtained have a substantially higher melting point than the raw materials, and are therefore not liable to change their shape even at high temperatures. Moreover, they are difficult to burn, so that they can be used in numerous cases, in which the tarry or bituminous materials would be unsuitable owing to their danger of catching fire.

What I claim is:—

1. The process for reducing the fusibility of bituminous or tarry materials and for increasing their resistance to heat, which consists in mixing the said materials with substances adapted to absorb chlorin, and treating the mixture with hexa-chlor-ethane with the aid of heat, substantially as described.

2. The process for increasing the resistance of bituminous or tarry materials to heat, which consists in mixing the said material with an unsaturated fatty acid ester and treating the mixture with hexa-chlor-ethane, with the aid of heat, substantially as described.

In testimony whereof I have hereunto set my hand in presence of two subscribing witnesses.

KARL LUDWIG VALENTIN ZIMMER, Dr. phgl.

Witnesses:
 MAX MÜLLER,
 MAX HESSE.